Patented June 21, 1938

2,121,341

UNITED STATES PATENT OFFICE 2,121,341

TREATMENT OF ARTIFICIAL MATERIALS

Henry Dreyfus, London, England

No Drawing. Application July 11, 1935, Serial No. 30,945. In Great Britain July 26, 1934

1 Claim. (Cl. 28—1)

This invention relates to improvements in the treatment of artificial textile materials and is more particularly concerned with the fixation of titanium or other compounds on artificial silk materials, and especially to processes for effecting reduction in the lustre of these materials.

I have found that titanium oxide may vary advantageously be fixed in artificial silk by subjecting the artificial silk, impregnated with a titanium salt, to the action of gaseous ammonia or other volatile base in conjunction with steam. Preferably the steam is applied before or together with the volatile base. It is most advantageous to apply the ammonia or similar base simultaneously with the steam, and that a comparatively high temperature, for example a temperature of the order of 85 to 105° C., and more particularly 95 to 105° C. should be employed. The materials obtained by these means are much superior to those obtainable by using ammonia or other amine in solution or in the form of vapour, and without the use of steam. Not only is a better fixation in the material of the titanium obtained in the sense that immediately or after an initial scour the precipitated material is much faster to washing, but in addition the compound is precipitated in a much better form in or on the material. In general the precipitate appears to be more finely divided, giving a better appearance to a fabric, for example. The invention is not confined to the fixation of titanium in the artificial materials but may be applied generally to the fixation in or on the materials of insoluble oxides. The oxides may be in hydrated form. Thus, for instance, tungsten, antimony and bismuth may be fixed in the materials in the form of their oxides.

The titanium or other metal is preferably applied to the materials in the form of an aqueous solution of a water-soluble salt, for example the chloride, sulphate, thiocyanate or other water-soluble salt of tetra-valent titanium. Very good results may be obtained with comparatively concentrated solutions, e. g. solutions of 15 to 25% strength. Salts of titanium in other stages of oxidation, for example in the tri-valent stage, may be utilized if desired, for instance titanous chloride or thiocyanate may be used. Where tri-valent titanium salts are applied the titanium may subsequently be oxidized at any suitable stage in the treatment of the materials. For example material impregnated with a titanous salt may be subjected to air or other oxidation before or after the fixation by steam and ammonia or other volatile base.

Any desired methods may be utilized for the application of the titanium or other salts to the materials. For example the reagents may be applied by bath methods or by padding, spraying, printing or other form of mechanical impregnation. Spraying, printing and the like may be utilized to produce local effects for the production, for example, of fabrics exhibiting differential lustre. The methods involving the use of mechanical impregnation are particularly convenient in that they enable the titanium or other compounds to be applied to the material in predetermined quantities. Padding and spraying are particularly suitable, though predetermined quantities may also be applied by impregnating the material in a bath of the desired reagent and thereafter hydro-extracting or subjecting to suction or otherwise treating in order to remove the reagent in excess of the desired quantity. The material may, for example, be passed through a bath of titanium chloride so as to take up excess of the reagent, and subsequently carried over a perforated drum the interior of which is connected to a suction plant, thereby removing excess titanium chloride. If desired the material may be subjected to a drying treatment between the impregnation with the titanium or other compound and the fixation of the titanium or other metal by means of the steam in conjunction with ammonia or other volatile base. Preferably such drying is not carried to completion. The drying may, for example, be combined with a hydro-extraction, for example, to remove excess of the reagent. For instance the perforated drum referred to above connected in turn with the suction plant may be suitably heated so as to effect a simultaneous and preferably partial drying of the material.

The invention may be applied generally to artificial silk materials of all kinds. It is, however, particularly suitable for reducing the lustre of artificial silk materials made of or containing cellulose acetate or other organic derivative of cellulose, for instance cellulose formate, propionate, butyrate, nitro-acetate or other organic ester of cellulose, or methyl, ethyl or benzyl cellulose or other ether of cellulose, or mixed ether-esters, for instance oxyethyl cellulose acetate.

In order to facilitate the wetting or penetration of the materials by the titanium or similar reagents, wetting agents or swelling agents for the materials may be incorporated in the solutions of the reagents, or the materials may be pretreated with such agents. As examples of swelling agents for cellulose ester or ether materials may be mentioned alkali or alkaline earth or other soluble thiocyanates, or organic swelling agents, for instance acetic acid, formic acid, or other organic acid, ethyl or other alcohol, acetone or other ketone, cyclic ethers, glycol ethers or esters or ether-esters, or aromatic hydroxy compounds. The titanium or other salt may itself be capable of swelling the material under treatment. For instance titanium thiocyanate may be employed in a concentration sufficient to swell the cellulose acetate or other cellulose ester or ether.

The materials impregnated as described above with the titanium or other compound may be treated directly with steam and ammonia or other volatile base. Such an atmosphere may, for example, be obtained by the simple volatilization of a suitable aqueous solution of ammonia or a volatile base, e. g. methylamine or other volatile aliphatic amine. Preferably, however, the ammonia or other volatile base or a solution thereof is injected into a steam chamber and is volatilized by the steam. As previously indicated it is advantageous to effect the fixation at a comparatively high temperature. In order to obtain high temperatures the fixation chamber may if desided be maintained under pressure.

The process of the present invention may be carried out continuously, the fabric, yarn or other material being carried continuously through an impregnating bath or padding mangle to the fixing chamber containing steam and ammonia or other volatile organic base, with or without inter-position of any desired intermediate treatment such as hydro-extraction or drying. For instance a cellulose acetate fabric may be padded with a solution of titanium chloride in the cold and carried directly into an atmosphere of steam and ammonia at 100° C. The period of treatment with the steam and ammonia or other volatile base may be relatively short. For example, in treating with ammonia and steam at 100° C. the fixation time may be of the order of 2 minutes.

After the fixation of the titanium or other metal or element in the materials the latter may be subjected to any suitable scouring operation, for example they may be washed in hot water, for example water at 60° C., and then washed in cold water and finally scoured in a hot dilute soap solution. In general a single scour is sufficient to finish the material.

The invention is illustrated but not limited by the following example:—

Example

A cellulose acetate fabric is passed through a cold aqueous solution of titanium tetrachloride of 20% strength, the time of passage being about 4 minutes. The material is then squeezed so that it retains about its own weight of the titanium chloride solution, and is thereafter passed through a chamber containing steam at about 100° C., the time of passage being about 2 minutes. Into the steam chamber concentrated aqueous ammonia is injected at such a rate that the fabric issuing from the steam chamber has a substantially neutral reaction. The material is thereafter rinsed in water and scoured in a hot aqueous soap solution. An excellent matt finish is thus imparted to the fabric.

What I claim and desire to secure by Letters Patent is:—

Process for reducing the luster of cellulose acetate fabric, which comprises passing the fabric through an aqueous solution of titanium tetrachloride of 20% concentration so that said fabric contains about its own weight of the said titanium tetrachloride solution and passing the so treated fabric through an atmosphere of steam and ammonia at a temperature of about 100° C. for about two minutes.

HENRY DREYFUS.